(12) United States Patent
Dao et al.

(10) Patent No.: US 11,101,831 B2
(45) Date of Patent: Aug. 24, 2021

(54) RF SIGNAL TRANSMISSION APPARATUS AND CONTROL METHOD THEREFOR

(71) Applicant: Samsung Electronics Co., Ltd., Suwon-si (KR)

(72) Inventors: Tuan Manh Dao, Suwon-si (KR); Yonghoon Kim, Suwon-si (KR); Yuichi Aoki, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 16/965,499

(22) PCT Filed: Jan. 10, 2019

(86) PCT No.: PCT/KR2019/000378
§ 371 (c)(1),
(2) Date: Jul. 28, 2020

(87) PCT Pub. No.: WO2019/151671
PCT Pub. Date: Aug. 8, 2019

(65) Prior Publication Data
US 2021/0050874 A1 Feb. 18, 2021

(30) Foreign Application Priority Data
Jan. 30, 2018 (KR) .................. 10-2018-0011412

(51) Int. Cl.
*H04L 27/36* (2006.01)
*H04B 1/04* (2006.01)
(Continued)

(52) U.S. Cl.
CPC .......... *H04B 1/0475* (2013.01); *H04B 1/525* (2013.01); *H04B 7/06* (2013.01); *H04B 17/14* (2015.01); *H04L 27/364* (2013.01)

(58) Field of Classification Search
CPC ........ H04B 1/0475; H04B 1/40; H04B 17/11; H04B 17/21; H04B 1/525; H04B 1/30;
(Continued)

(56) References Cited

U.S. PATENT DOCUMENTS 6,411,256 B1  6/2002  Lier et al.
7,068,984 B2 *  6/2006  Mathe .................. H03F 1/0222
                                                      455/126

(Continued)

FOREIGN PATENT DOCUMENTS

KR  10-2008-0013092 A  2/2008
KR  10-2010-0026360 A  3/2010
(Continued)

OTHER PUBLICATIONS

International Search Report dated Mar. 29, 2019, Issued in International Application No. PCT/KR2019/000378.
European Office Action dated Nov. 10, 2020, issued in European Application No. 19747957.9-1220 / 3726734.

*Primary Examiner* — Eva Y Puente
(74) *Attorney, Agent, or Firm* — Jefferson IP Law, LLP

(57) ABSTRACT

Provided are a radio frequency (RF) signal transmission apparatus and a control method of the RF signal transmission apparatus, in which a local oscillator (LO) leakage signal may be suppressed. The RF signal transmission apparatus may perform beamforming to form a beam based on a plurality of RF signals generated in a plurality of transmission chains, measure magnitude of an LO leakage signal of the beam formed by performing beamforming, and generate an LO leakage suppression signal based on the magnitude of the LO leakage signal.

14 Claims, 7 Drawing Sheets

(51) Int. Cl.
*H04B 17/14* (2015.01)
*H04B 1/525* (2015.01)
*H04B 7/06* (2006.01)

(58) Field of Classification Search
CPC .......... H04B 2001/0425; H04B 17/309; H04B 1/04; H04B 1/1027; H04B 15/04; H04B 17/104; H04B 17/391; H04B 1/10; H04B 1/16; H04B 15/00; H04B 17/12; H04B 17/13; H04B 17/14; H04L 27/364; H04L 27/34; H04L 27/367; H04L 27/38; H04L 27/3809; H04L 27/2613; H04L 5/0023; H04L 2027/0016; H04L 27/0014; H04L 27/206; H04L 27/2273; H04L 27/265; H04L 27/3863; H04L 5/0064; H04L 1/00; H04L 1/0083; H04L 25/02
USPC .................................................. 375/221, 224
See application file for complete search history.

(56) References Cited

U.S. PATENT DOCUMENTS

| | | |
|---|---|---|
| 9,401,801 B1 * | 7/2016 | Park .......................... H04B 1/40 |
| 2006/0009171 A1 | 1/2006 | Xu et al. |
| 2008/0032641 A1 | 2/2008 | Ahn |
| 2010/0056091 A1 | 3/2010 | Jang et al. |
| 2013/0040582 A1 | 2/2013 | Hamada |
| 2013/0308693 A1 * | 11/2013 | Li ........................... H04B 17/21 |
| | | 375/224 |
| 2014/0269863 A1 * | 9/2014 | Fan ......................... H04B 1/525 |
| | | 375/221 |
| 2015/0118980 A1 | 4/2015 | Leung et al. |
| 2019/0089448 A1 * | 3/2019 | Jakobsson ................ H04B 1/40 |
| 2020/0382060 A1 * | 12/2020 | Hallin .................... H03D 7/161 |

FOREIGN PATENT DOCUMENTS

| | | |
|---|---|---|
| KR | 10-1120410 B1 | 3/2012 |
| WO | 2017/052927 A1 | 3/2017 |

* cited by examiner

RF SIGNAL TRANSMISSION APPARATUS AND CONTROL METHOD THEREFOR

TECHNICAL FIELD

The present disclosure relates to a wireless communication field. In particular, the present disclosure relates to local oscillator (LO) leakage signal suppression in radio frequency (RF) transmission.

BACKGROUND ART

In a radio frequency (RF) transmission system, a part of a local oscillator (LO) signal leaks as an output signal through a mixer and is transmitted as a spurious signal via an antenna. As such, the spurious signal resulting from due to leakage of the part of the LO signal is referred to as an LO leakage signal. The LO leakage signal needs to be suppressed as an unnecessary signal that does not carry information.

A level of the spurious signal has to satisfy spectrum mask requirements. In a single RF chain system, such requirements may be easily satisfied. However, in a system including a plurality of RF chains, such as a phased-array system, spurious signals respectively occurred in the plurality of RF chains by beamforming are summed together, making it difficult to satisfy the spectrum mask requirements. Therefore, suppression of a spurious signal in a phased-array system may be an issue.

DESCRIPTION OF EMBODIMENTS

Solution to Problem

According to a disclosed embodiment, a radio frequency (RF) signal transmission apparatus and a control method of the RF signal transmission apparatus are provided, in which a local oscillator (LO) leakage signal may be suppressed.

Additional aspects will be set forth in part in the description which follows and, in part, will be apparent from the description, or may be learned by practice of the presented embodiments.

BRIEF DESCRIPTION OF DRAWINGS

The present disclosure may be easily understood by a combination of the following detailed description and the accompanying drawings, in which reference numerals refer to structural elements.

BEST MODE

Figure 1:
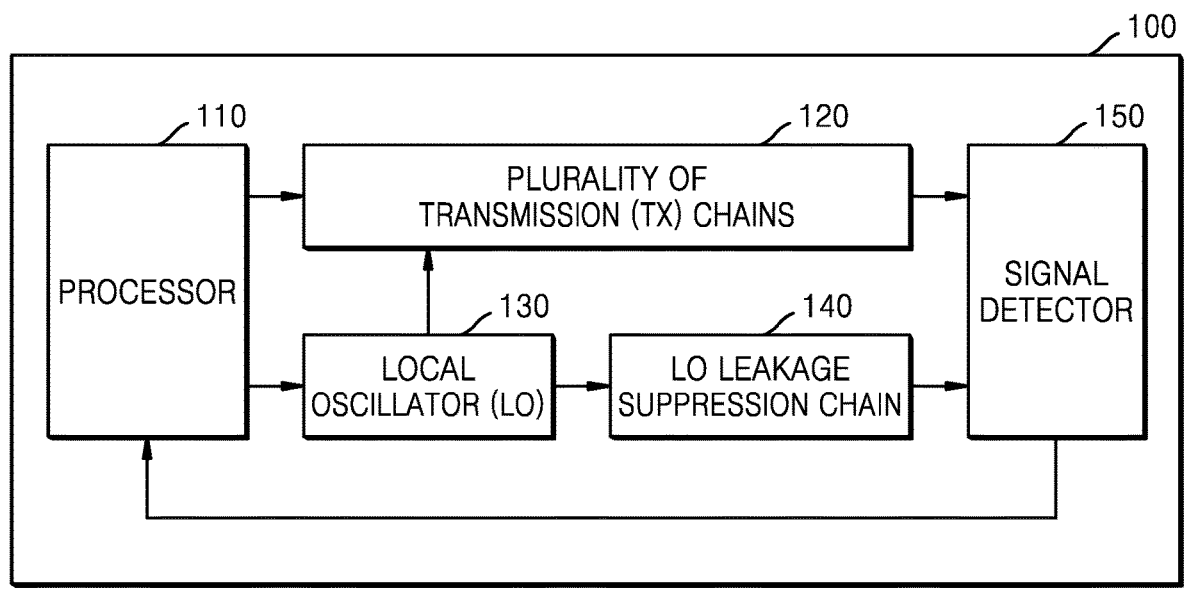
FIG. 1 is a block diagram of a radio frequency (RF) signal transmission apparatus, according to an embodiment.

According to a first aspect of the present disclosure, there is provided a radio frequency (RF) signal transmission apparatus including a plurality of transmission (Tx) chains configured to generate a plurality of RF signals, a signal detector configured to measure magnitude of a local oscillator (LO) leakage signal of a beam formed based on the plurality of RF signals, an LO, an LO leakage suppression chain connected with the LO, and at least one processor configured to generate an LO leakage suppression signal through the LO leakage suppression chain, based on the magnitude of the LO leakage signal.

The at least one processor may be further configured to generate the LO leakage suppression signal through the LO leakage suppression chain, when the magnitude of the LO leakage signal is greater than a preset value.

The LO leakage suppression chain may further include a variable gain amplifier configured to adjust magnitude of the LO leakage suppression signal, a phase shifter configured to adjust a phase of the LO leakage suppression signal, and an antenna configured to transmit the LO leakage suppression signal.

The variable gain amplifier may be further configured to output the magnitude of the LO leakage suppression signal according to the magnitude of the LO leakage signal.

The phase shifter may be further configured to adjust the phase of the LO leakage suppression signal to differ by 180 degrees from the phase of the LO leakage signal.

The LO leakage suppression signal may be transmitted via an antenna of one of the plurality of transmission chains.

The at least one processor may be further configured to generate a lookup table (LUT) including information about magnitude and a phase of the LO leakage suppression signal corresponding to the formed beam.

Each of the plurality of transmission chains may include a phase shifter and a power amplifier, and the at least one processor may be further configured to perform beamforming to form the beam by controlling the phase shifter and the power amplifier based on magnitudes of the plurality of RF signals measured by the signal detector.

Each of the plurality of transmission chains may include an intermediate frequency (IF) chain and an RF chain, and the phase shifter may be included in at least one of the IF chain or the RF chain.

Each of the plurality of transmission chains may include a power amplifier, the LO may be connected to the plurality of transmission chains through a plurality of LO chains, each of which may include a phase shifter, and the at least one processor may be further configured to perform beamforming to form the beam by controlling the phase shifter and the power amplifier based on magnitudes of the plurality of RF signals measured by the signal detector.

According to a second aspect of the present disclosure, there is provided a control method of a radio frequency (RF) signal transmission apparatus, the control method including performing beamforming to form a beam based on a plurality of RF signals generated in a plurality of transmission chains, measuring magnitude of a local oscillator (LO) leakage signal of the beam formed by performing beamforming, and generating an LO leakage suppression signal based on the magnitude of the LO leakage signal.

MODE OF DISCLOSURE

Hereinafter, embodiments of the present disclosure will be described in detail with reference to the attached drawings to allow those of ordinary skill in the art to easily carry out the embodiments. However, the present disclosure may be implemented in various forms, and are not limited to the embodiments described herein. To clearly describe the present disclosure with drawings, parts that are not associated with the descriptions are omitted from the drawings, and throughout the specification, identical reference numerals refer to identical parts.

Some embodiments of the present disclosure may be represented by block components and various process operations. All or some of such functional blocks may be implemented by various numbers of hardware and/or software components which perform specific functions. For example, functional blocks of the present disclosure may be implemented by one or more microprocessors or may be implemented by circuit elements for a specific function. Also, for example, the functional blocks of the present disclosure may also be implemented with various programming or scripting languages. Functional blocks may be implemented in an algorithm executed in one or more processors. Furthermore, the present disclosure may employ any number of techniques according to the related art for electronics configuration, signal processing and/or control, data processing and the like.

Connecting lines or connecting members between elements shown in the drawings are intended to merely illustrate functional connections and/or physical or circuit connections. In an actual device, connections between elements may be indicated by replaceable or added various functional connections, physical connections, or circuit connections.

The term used in the embodiments of the disclosure such as "unit" or "module" indicates a unit for processing at least one function or operation, and may be implemented in hardware, software, or in a combination of hardware and software. The term "unit" or "module" may be implemented by a program that is stored in an addressable storage medium and executable by a processor.

For example, the term "unit" or "module" may include software components, object-oriented software components, class components and task components, processes, functions, attributes, procedures, subroutines, segments of a program code, drivers, firmware, microcode, circuitry, data, databases, data structures, tables, arrays, and variables.

FIG. 1 is a block diagram of a radio frequency (RF) signal transmission apparatus 100, according to an embodiment.

As illustrated in FIG. 1, the RF signal transmission apparatus 100 may include a processor 110, a plurality of transmission (Tx) chains 120, a local oscillator (LO) 130, an LO leakage suppression chain 140, and a signal detector 150. However, components of the RF signal transmission apparatus 100 according to an embodiment are not limited to the above-described example. According to another embodiment, the RF signal transmission apparatus 100 may include components that are more than or less than the above-described components.

The processor 110 may control the RF signal transmission apparatus 100.

In an embodiment, the processor 110 may perform control for beamforming based on a plurality of RF signals generated in the plurality of Tx chains 120. For example, the processor 110 may perform calibration on phases and magnitudes of a plurality of RF signals for beamforming of the plurality of RF signals in a desired direction, based on the magnitudes of the plurality of RF signals, measured by the signal detector 150. Herein, the processor 110 may control a phase shifter and an amplifier that are included in the RF signal transmission apparatus 100 to perform calibration on the phases and the magnitudes of the plurality of RF signals. As such, the processor 110 may perform beamforming on the plurality of RF signals generated in the plurality of Tx chains 120 through calibration of the phases and the magnitudes of the plurality of RF signals generated in the plurality of Tx chains 120.

In an embodiment, the processor 110 may generate an LO leakage suppression signal for suppressing an LO leakage signal through the LO leakage suppression chain 140, based on magnitude of the LO leakage signal. Herein, in general, the LO leakage signal may refer to a Spurious signal resulting from leakage of a part of an LO signal generated in an LO as an output signal. However, unless mentioned otherwise, the LO leakage signal in the present disclosure may refer to a summed signal corresponding to summation of LO leakage signals respectively included in a plurality of RF signals generated in the plurality of Tx chains 120 based on beamforming performed on the plurality of RF signals.

In an embodiment, the processor 110 may generate an LO leakage suppression signal through the LO leakage suppression chain 140 when magnitude of the LO leakage signal is greater than a preset value. Herein, a preset value that is a criterion used for the processor 110 to generate an LO leakage suppression signal may follow spectrum mask requirements specified in the 47 CFR 101.111 of the Federal Communications Commission (FCC) standard. Herein, the spectrum mask requirements may be restrictions for magnitude of a signal to be transmitted in a frequency band away from a central frequency of the signal by a certain frequency to restrict adjacent-channel interference in a frequency band exceeding a required bandwidth. However, the above-described criterion may be an example, such that a value that is a criterion for generating an LO leakage suppression signal may change based on user's setting.

In an embodiment, the processor 110 may generate a lookup table (LUT) including information about magnitude and a phase of an LO leakage suppression signal. The magnitude and the phase of the LO leakage suppression signal may vary with a direction in which beamforming is performed on a plurality of RF signals. Thus, the processor 110 may store the information about the magnitude and the phase of the LO leakage suppression signal, which correspond to the direction in which beamforming is performed on the plurality of RF signals, in the LUT. The processor 110 may generate the LUT by including the phases and the magnitudes of the plurality of RF signals, based on which beams are formed, together with the magnitude and the phase of the LO leakage suppression signal.

The plurality of Tx chains 120 may generate the plurality of RF signals for RF transmission. According to an embodiment, each of the plurality of Tx chains 120 may include an intermediate frequency (IF) chain, an up mixer, and an RF chain. Components of the plurality of Tx chains 120 and functions thereof will be described in detail later with reference to FIG. 2.

The LO 130 may generate a signal for frequency conversion and deliver the signal to another component. For example, the LO 130 may provide a signal of a certain frequency to the up mixer for upconverting an IF signal into an RF signal. The LO 130 may deliver a signal that is a basis for LO leakage suppression signal generation to the LO leakage suppression chain 140.

The LO 130 may be connected to the plurality of Tx chains 120 through a plurality of LO chains. The plurality of LO chains may be connected to the up mixer included in each of the plurality of Tx chains 120.

Each of the plurality of LO chains connected to the LO 130 may include a phase shifter for converting a phase of a signal. In an embodiment, the phase shifter included in each of the plurality of LO chains may be used in phase calibration of an RF signal generated in the Tx chain 120.

The LO leakage suppression chain 140 may generate an LO leakage suppression signal for suppressing an LO leakage signal of a beam formed based on a plurality of RF signals, under control of the processor 110. The LO leakage suppression chain 140 may be connected to the LO 130 to receive a signal that is a basis for LO leakage suppression signal generation from the LO 130. The LO leakage suppression chain 140 may generate an LO leakage suppression signal by calibrating a phase and magnitude of the signal received from the LO 130, under control of the processor 110.

The signal detector 150 may measure magnitude of a signal. More specifically, the signal detector 150 may measure magnitudes of a plurality of RF signals. The signal detector 150 may measure magnitude of an LO leakage signal of a beam formed based on the plurality of RF signals. The signal detector 150 may transmit a measurement value of the magnitude of the signal to the processor 110. The transmitted measurement value of the magnitude may be used for the processor 110 to perform beamforming and for the processor 110 to generate an LO leakage suppression signal through the LO leakage suppression chain 140.

Figure 2:
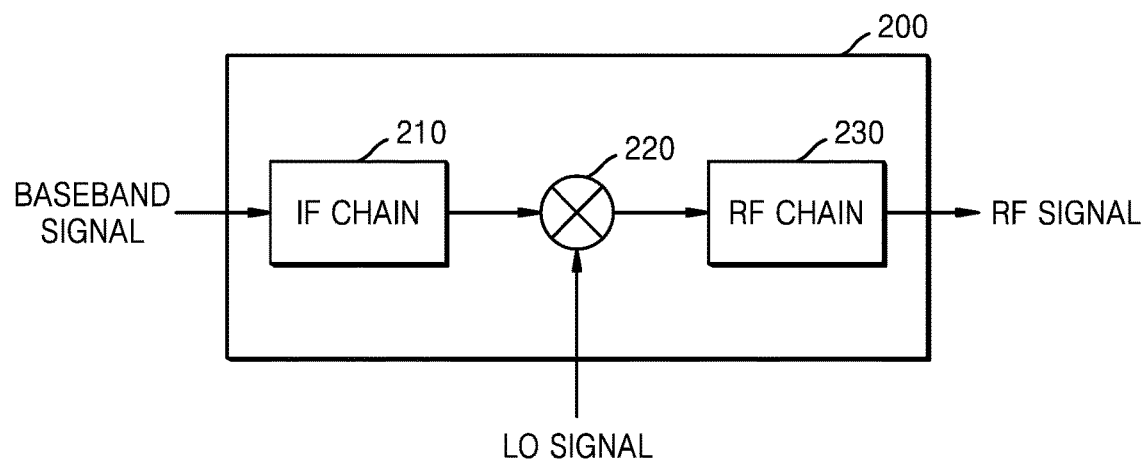
FIG. 2 is a block diagram showing a transmission (Tx) chain according to an embodiment.

FIG. 2 is a block diagram of a Tx chain 200 according to an embodiment. The Tx chain 200 may correspond to a Tx chain of the plurality of Tx chains 120 shown in FIG. 1.

As illustrated in FIG. 2, the Tx chain 200 may include an IF chain 210, an RF up mixer 220, and an RF chain 230. However, components of the Tx chain 200 according to an embodiment are not limited to the above-described example. According to another embodiment, the Tx chain 200 may include components that are more than or less than the above-described components.

The IF chain 210 may process a baseband signal and convert the baseband signal into a signal in an IF band. The IF chain 210 may include an IF amplifier, a channel-select filter, etc. The IF amplifier may amplify a baseband signal and the channel-select filter may band-pass filter and select a desired channel from a signal including multiple channels.

The RF up mixer 220 may mix an IF signal with an LO signal and up-convert the IF signal into an RF signal of a desired frequency. In an embodiment, the RF up mixer 220 may receive the IF signal from the IF chain 210 and the LO signal from the LO 130 to mix the IF signal with the LO signal into an RF signal that is an up-converted signal.

The RF chain 230 may process and transmit an RF signal. The RF chain 230 may include a band-select filter, a power amplifier, an antenna, etc. The band-select filter may pass desired channel bands to prevent a Spurious frequency component such as an LO leakage signal from being amplified by the power amplifier. The power amplifier may amplify a signal to transmit a signal having a sufficient power. The antenna may radiate the RF signal processed in the RF chain 230 in the form of an electromagnetic wave to the air.

The Tx chain 200 may include a phase shifter for adjusting a phase of a signal in the Tx chain 200. Herein, the phase shifter may be included in at least one of the IF chain 210 or the RF chain 230. In an embodiment, the phase shifter included in the Tx chain 120 may be used in phase calibration of an RF signal generated in the Tx chain 120.

Figure 3:
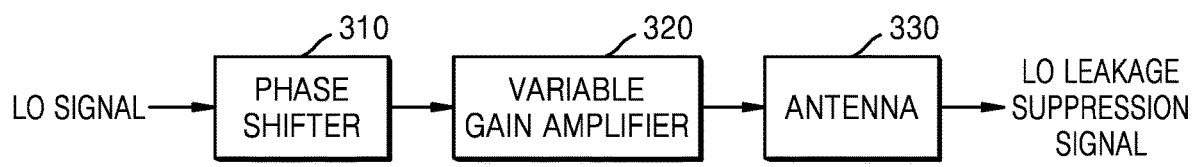
FIG. 3 is a block diagram showing a local oscillator (LO) leakage suppression chain according to an embodiment.

FIG. 3 is a block diagram showing the LO leakage suppression chain 140 according to an embodiment.

As shown in FIG. 3, the LO leakage suppression chain 140 may include a phase shifter 310, a variable gain amplifier 320, and an antenna 330. However, components of the LO leakage suppression chain 140 according to an embodiment are not limited to the above-described example. According to another embodiment, the LO leakage suppression chain 140 may include components that are more than or less than the above-described components.

The order of the phase shifter 310 and the variable gain amplifier 320 shown in FIG. 3 may merely follow an embodiment and are not limited thereto. However, for convenience of a description, the phase shifter 310 and the variable gain amplifier 320 will be described in an order in which they are illustrated in FIG. 3.

The LO leakage suppression chain 140 may receive a signal that is a basis for LO leakage suppression signal generation from the LO 130 and generate an LO leakage suppression signal by calibrating a phase and magnitude of the signal received from the LO 130, under control of the processor 110.

The phase shifter 310 may adjust a phase of a signal input from the LO 130. In an embodiment, the phase shifter 310 may adjust the phase of the signal delivered from the LO 130 to differ by 180 degrees from the phase of the LO leakage signal of the beam formed based on the plurality of RF signals.

The variable gain amplifier 320 may adjust magnitude of the signal input from the LO 130. In an embodiment, the variable gain amplifier 320 may output the signal delivered from the LO 130 after adjusting the delivered signal such that the magnitude of the delivered signal becomes equal to the magnitude of the LO leakage signal of the beam formed based on the plurality of RF signals.

As such, under control of the processor 110, the LO leakage suppression chain 140 may perform calibration on the phase and the magnitude of the signal delivered from the LO 130 through adjustment of the phase and the magnitude in the phase shifter 310 and the variable gain amplifier 320. The generated LO leakage suppression signal may be 180-degree out of phase with the LO leakage signal, and may have the same magnitude as the LO leakage signal.

The antenna 330 may radiate the generated LO leakage suppression signal in the form of an electromagnetic wave to the air. In an embodiment, the antenna 330 may equally correspond to an antenna of one of the plurality of Tx chains 120. That is, the LO leakage suppression chain 140 may be connected with an antenna of one of the plurality of Tx chains and radiate the LO leakage suppression signal in the form of an electromagnetic wave to the air via the antenna of the Tx chain.

According to a disclosed embodiment, the LO leakage suppression chain 140 may generate the LO leakage suppression signal under control of the processor 110, thus attenuating LO leakage signals summed based on beamforming in the phased-array system. In addition, in a sense that the RF transmission system uses the generally included LO 130 and uses any one of the phase shifter 310, the variable gain amplifier 320, and the antenna 330, the RF transmission system may suppress the LO leakage signal at low cost. Cost may be further cut down when the LO leakage suppression chain 140 uses an antenna of one of the plurality of Tx chains 120 than when the LO leakage suppression chain 140 includes a separate antenna.

Figure 4:
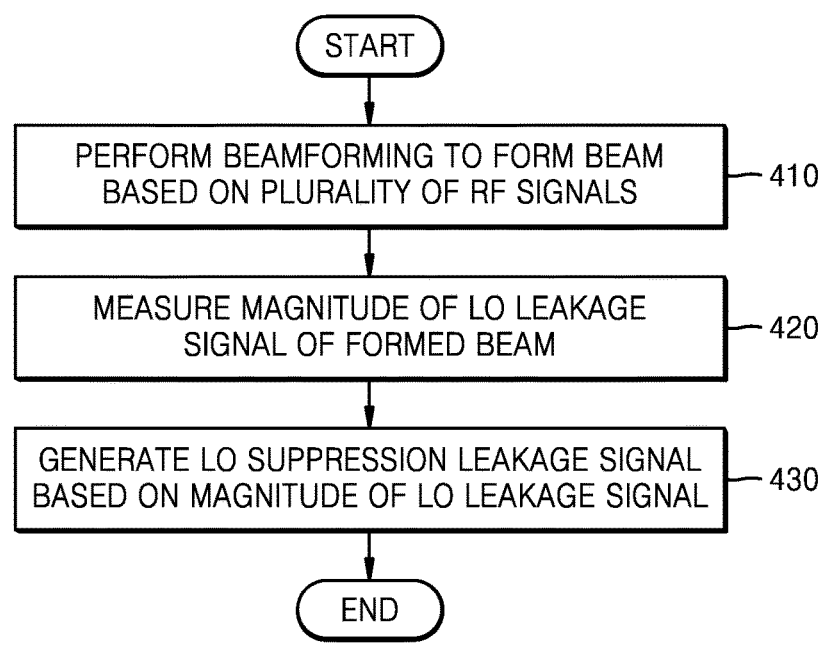
FIG. 4 is a flowchart illustrating a control method of an RF signal transmission apparatus, according to an embodiment.

FIG. 4 is a flowchart illustrating a control method of an RF signal transmission apparatus, according to an embodiment, to generate an LO leakage elimination signal.

A method of generating the LO leakage elimination signal according to the present disclosure may be performed by various types of the RF signal transmission apparatus that transmits an RF signal. In the present disclosure, an embodiment in which the method, performed by the RF signal transmission apparatus 100, of generating the LO leakage elimination signal has been described, but the embodiment is not limited thereto. In addition, embodiments disclosed for the RF signal transmission apparatus 100 in the present disclosure may also be applied to the control method of the RF signal transmission apparatus.

In operation 410, the RF signal transmission apparatus 100 may perform beamforming to form a beam based on a plurality of RF signals.

In an embodiment, the RF signal transmission apparatus 100 may generate the plurality of RF signals. The RF signal transmission apparatus 100 may measure magnitudes of the generated plurality of RF signals. The RF signal transmission apparatus 100 may perform calibration on phases and magnitudes of the plurality of RF signals for beamforming in a desired direction, based on measurement values of the magnitudes of the generated plurality of RF signals. Through beamforming performed by the RF signal transmission apparatus 100, the beam based on the plurality of RF signals generated in the RF signal transmission apparatus 100 may be formed.

In operation 420, the RF signal transmission apparatus 100 may measure magnitude of an LO leakage signal of the formed beam.

In operation 430, the RF signal transmission apparatus 100 may generate an LO leakage suppression signal based on the measured magnitude of the LO leakage signal.

In an embodiment, the RF signal transmission apparatus 100 may set magnitude of the LO leakage suppression signal equal to the magnitude of the LO leakage signal.

In an embodiment, the RF signal transmission apparatus 100 may set a phase of the LO leakage suppression signal to differ by 180 degrees from the phase of the LO leakage signal.

As such, by setting the magnitude of the LO leakage suppression signal equal to the magnitude of the LO leakage signal and setting the phase of the LO leakage suppression signal to differ by 180 degrees from the phase of the LO leakage signal, the RF signal transmission apparatus 100 may generate the LO leakage suppression signal for LO leakage signal suppression. Although not shown in FIG. 4, the RF signal transmission apparatus 100 may radiate the generated LO leakage suppression signal to attenuate the LO leakage signal of the beam formed based on the plurality of RF signals.

While operation 420 and operation 430 are illustrated as separate operations in FIG. 4, operation 420 and operation 430 may be performed at the same time. For example, operation 420 of measuring the magnitude of the LO leakage signal and operation 430 of generating the LO leakage suppression signal may be performed at the same time.

In an embodiment, the RF signal transmission apparatus 100 may measure the magnitude of the LO leakage signal of the beam formed based on the plurality of RF signals. The RF signal transmission apparatus 100 may set magnitude of the LO leakage suppression signal equal to the magnitude of the LO leakage signal. The RF signal transmission apparatus 100 may stepwisely calibrate the phase of the LO leakage suppression signal being set to have the same magnitude as the magnitude of the LO leakage signal. The RF signal transmission apparatus 100 may monitor a change in the magnitude of the summed signal corresponding to summation of the LO leakage signal and the LO leakage suppression signal, according to stepwise calibration of the phase of the LO leakage suppression signal. The RF signal transmission apparatus 100 may detect time when the magnitude of the summed signal corresponding to summation of the LO leakage signal and the LO leakage suppression signal is 0, and stop calibration of the phase of the LO leakage suppression signal. Herein, the measured phase of the LO leakage suppression signal may differ by 180 degrees from the phase of the LO leakage signal, and the phase of the LO leakage suppression signal may be set to differ by 180 degrees from the phase of the LO leakage signal.

According to a disclosed embodiment, the RF signal transmission apparatus 100 may generate the LO leakage suppression signal, thus attenuating LO leakage signals summed based on beamforming in the phased-array system and thus suppressing the LO leakage signal.

In addition, generation of the LO leakage suppression signal in the RF signal transmission apparatus 100 may be performed by a separate component other than a component for beamforming in the phase-arrayed system, such that LO leakage suppression has a few structural restrictions in the RF signal transmission apparatus 100. For example, a phase shifter for beamforming for a plurality of RF signals in the RF signal transmission apparatus 100 does not have an influence upon the LO leakage suppression chain 140 even when the phase shifter is included in any of the IF chain 210 or the RF chain 230 of the Tx chain 120 or an LO chain connecting the LO 130 with the Tx chain 120, thus having no influence upon LO leakage signal suppression. That is, according to a disclosed embodiment, the RF signal transmission apparatus 100 may not be affected by a type of a beamforming architecture in LO leakage signal suppression.

FIGS. 5 through 10 are graphs showing an LO leakage suppression process by the RF signal transmission apparatus 100, according to an embodiment. In FIGS. 5 through 10, for convenience of a description, the description will be limited to a case where the plurality of Tx chains 120 include four Tx chains. FIGS. 6 through 9 may correspond to operations 420 and 430 of FIG. 4.

Figure 5:
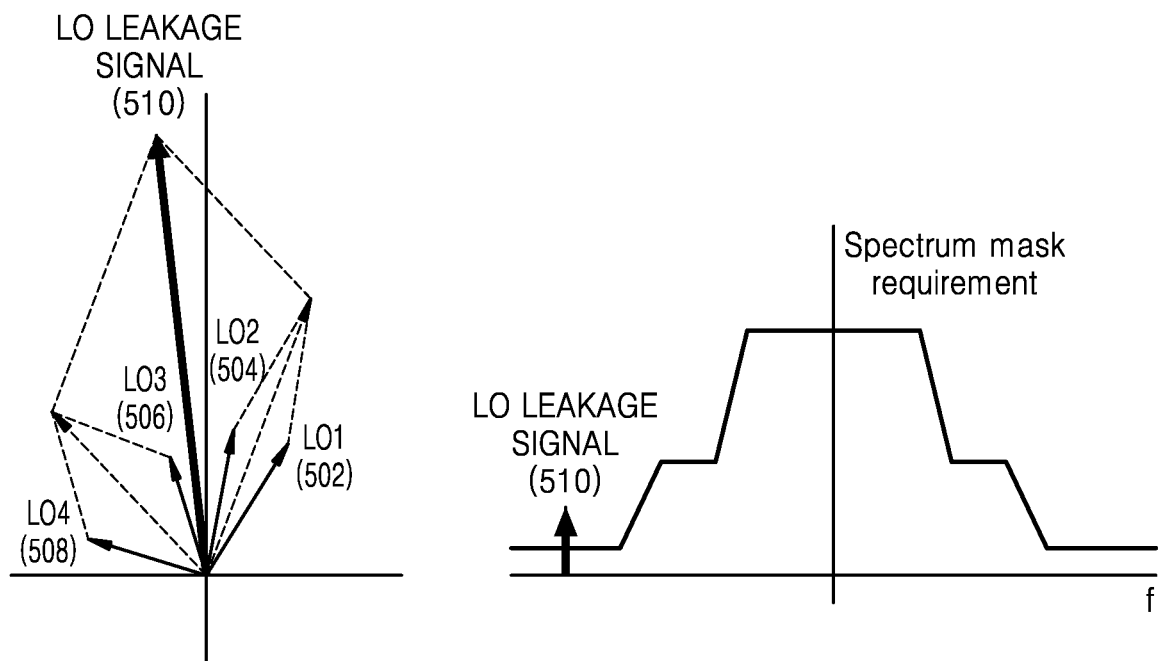
FIGS. 5 through 10 are graphs showing an LO leakage suppression process by an RF signal transmission apparatus, according to an embodiment.

FIG. 5 illustrates an LO leakage signal 510 prior to suppression.

Referring to a second-order plane of FIG. 5, it may be seen that the LO leakage signal 510 is a summed signal corresponding to summation of four signals 502, 504, 506, and 508. The four signals 502, 504, 506, and 508 may be LO leakage signals respectively included in RF signals generated from the four Tx chains 120. As shown in the second-order plane of FIG. 5, magnitude of the summed LO leakage signal 510 may be greater than magnitude of the LO leakage signal of each Tx chain.

In a frequency spectrum of FIG. 5, the summed LO leakage signal 510 shown in the second-order plane is indicated by an arrow. It may be seen that the LO leakage signal fails to satisfy spectrum mask requirements.

Figure 6:
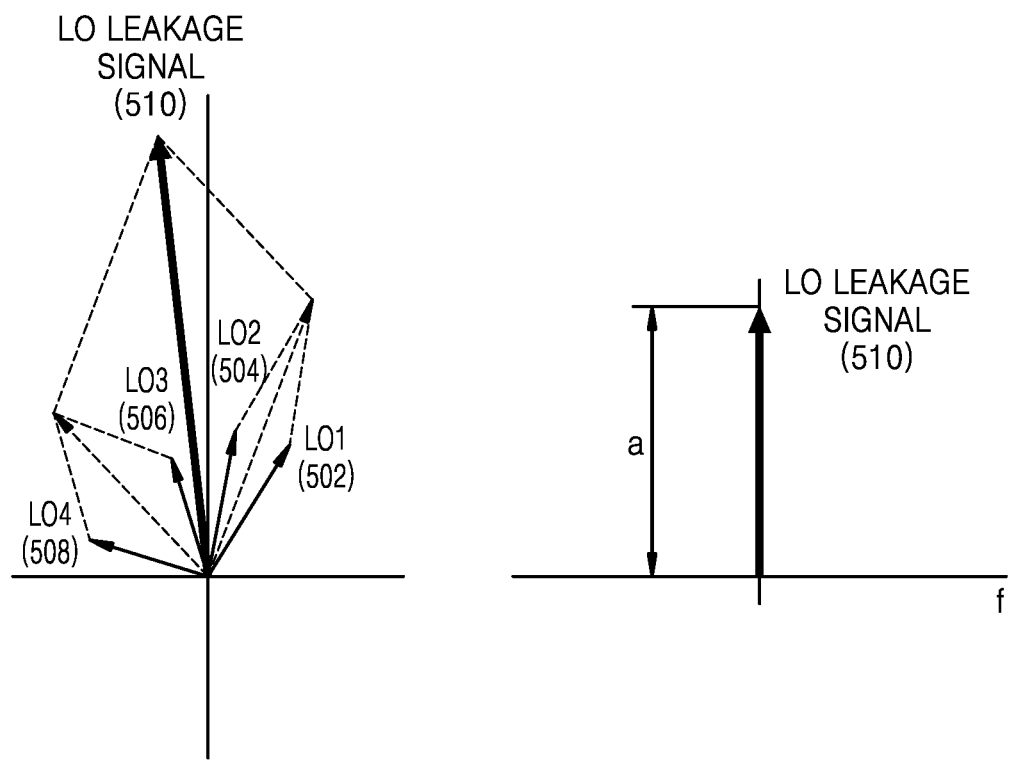

FIG. 6 shows a measurement result of the magnitude of the LO leakage signal 510.

Referring to a frequency spectrum of FIG. 6, it may be seen that the measurement result of the magnitude of the LO leakage signal 510 is a.

Figure 7:
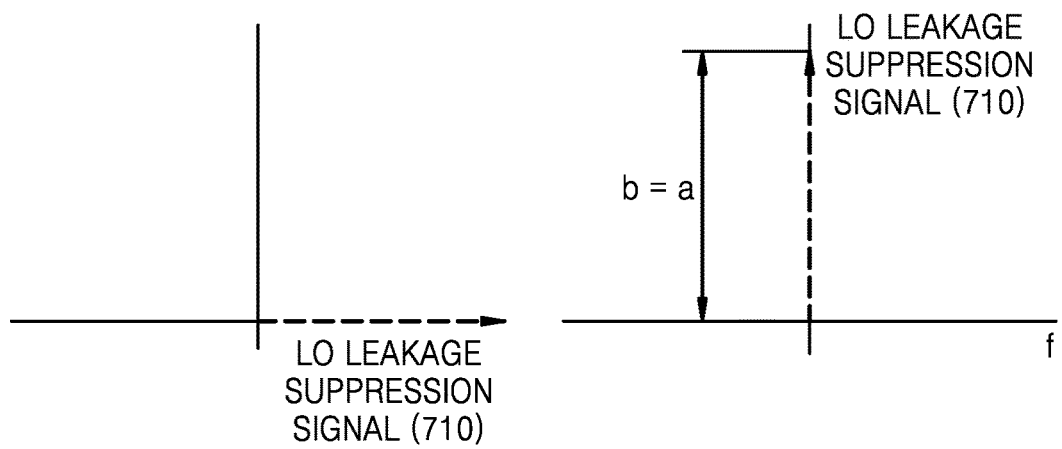

FIG. 7 illustrates an LO leakage suppression signal 710 with a calibrated magnitude.

The magnitude of the LO leakage suppression signal 710 of FIG. 7 is set equal to the magnitude of the LO leakage signal 510. More specifically, referring to a frequency spectrum of FIG. 7, magnitude b of the LO leakage suppression signal 710 is set equal to the magnitude a of the LO leakage signal 510 of FIG. 6. In the second-order plane of FIG. 7, the phase of the LO leakage suppression signal 710 is 0, but this merely indicates that the phase of the LO leakage suppression signal 710 is not adjusted, and the phase of the LO leakage suppression signal 710 prior to phase adjustment is not limited thereto.

Figure 8:
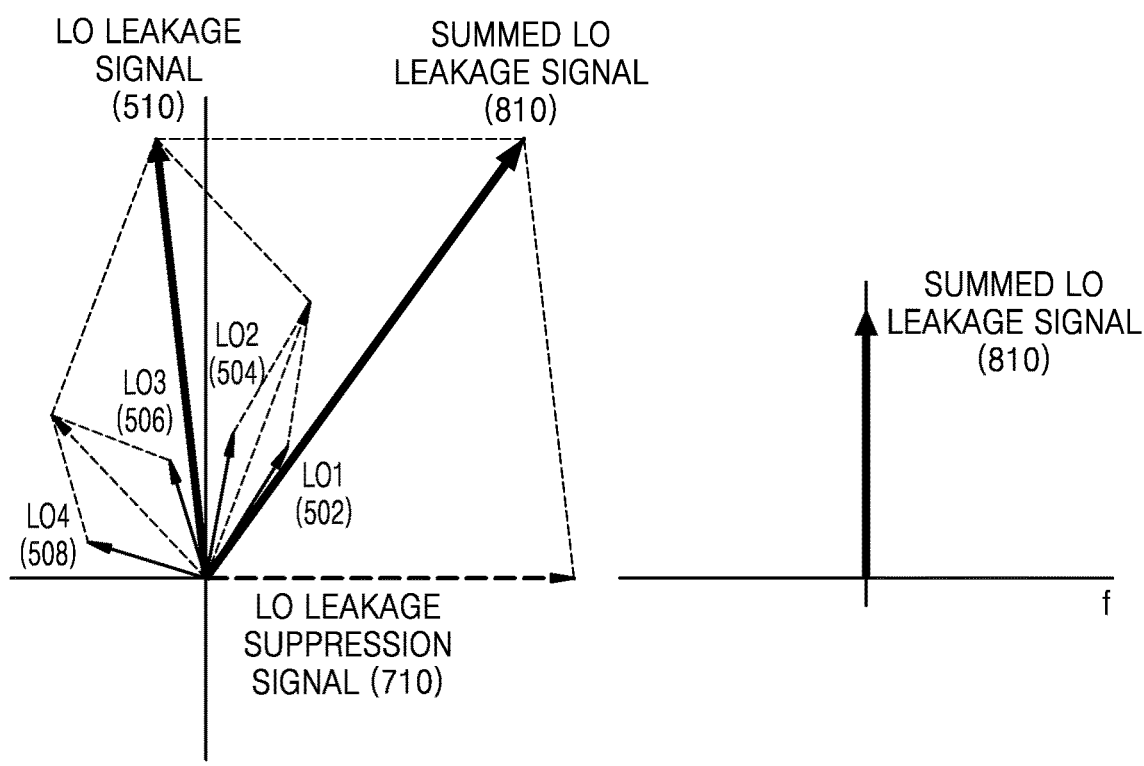

FIG. 8 illustrates a summed LO leakage signal 810 corresponding to summation of the magnitude-calibrated LO leakage suppression signal 710 and the LO leakage signal 510.

In a second-order plane of FIG. 8, a summed LO leakage signal 810 corresponding to summation of the LO leakage signal 510 and the LO leakage suppression signal 710. In this case, it is assumed that the magnitude of the LO leakage suppression signal is adjusted according to the LO leakage signal, and the phase of the LO leakage suppression signal is not adjusted.

In an embodiment of FIG. 8, when the LO leakage suppression signal, the phase of which is not adjusted, is summed with the LO leakage signal, the LO leakage signal increases. This is because summation is performed in a state where the phase of the LO leakage suppression signal is not calibrated, and it may be seen from the embodiment of FIG. 8 that to suppress the LO leakage signal, the LO leakage suppression signal has to be generated based on the magnitude and the phase of the LO leakage signal.

Figure 9:
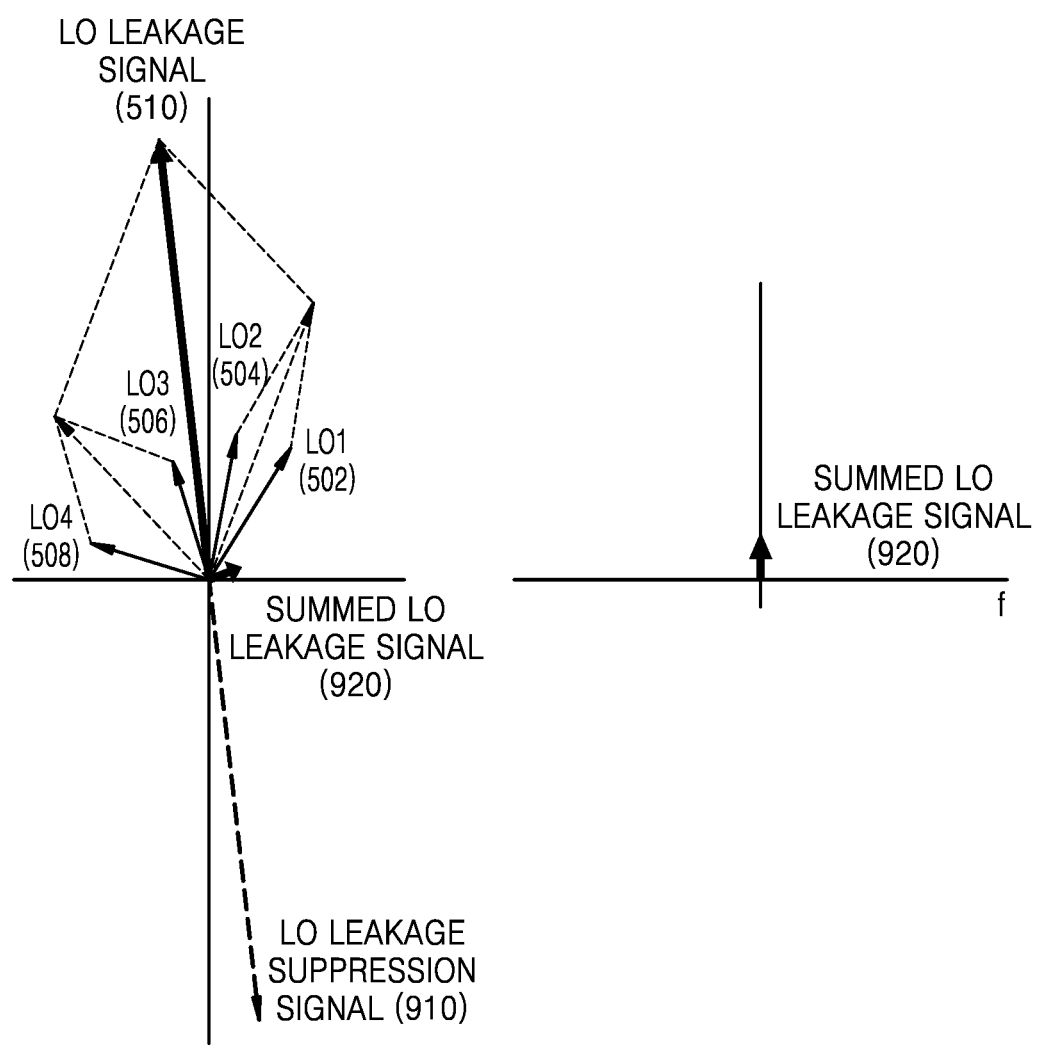

FIG. 9 illustrates a summed LO leakage signal 920 corresponding to summation of the LO leakage signal 510 and an LO leakage suppression signal 910, magnitude and a phase of which are calibrated.

In a second-order plane of FIG. 9, a signal corresponding to summation of the LO leakage signal 510 and the LO leakage suppression signal 910 having the calibrated magnitude and phase is illustrated as a summed LO leakage signal 920. In this case, the magnitude of the summed LO leakage signal 920 is shown in a frequency spectrum of FIG. 9. Referring to a frequency spectrum of FIG. 9, it may be seen that the magnitude of the summed LO leakage signal is reduced when compared to the magnitude of the LO leakage signal of FIG. 6, and is close to 0. Thus, it may be seen from FIG. 9 that the LO leakage signal is suppressed by the LO leakage suppression signal.

Figure 10:
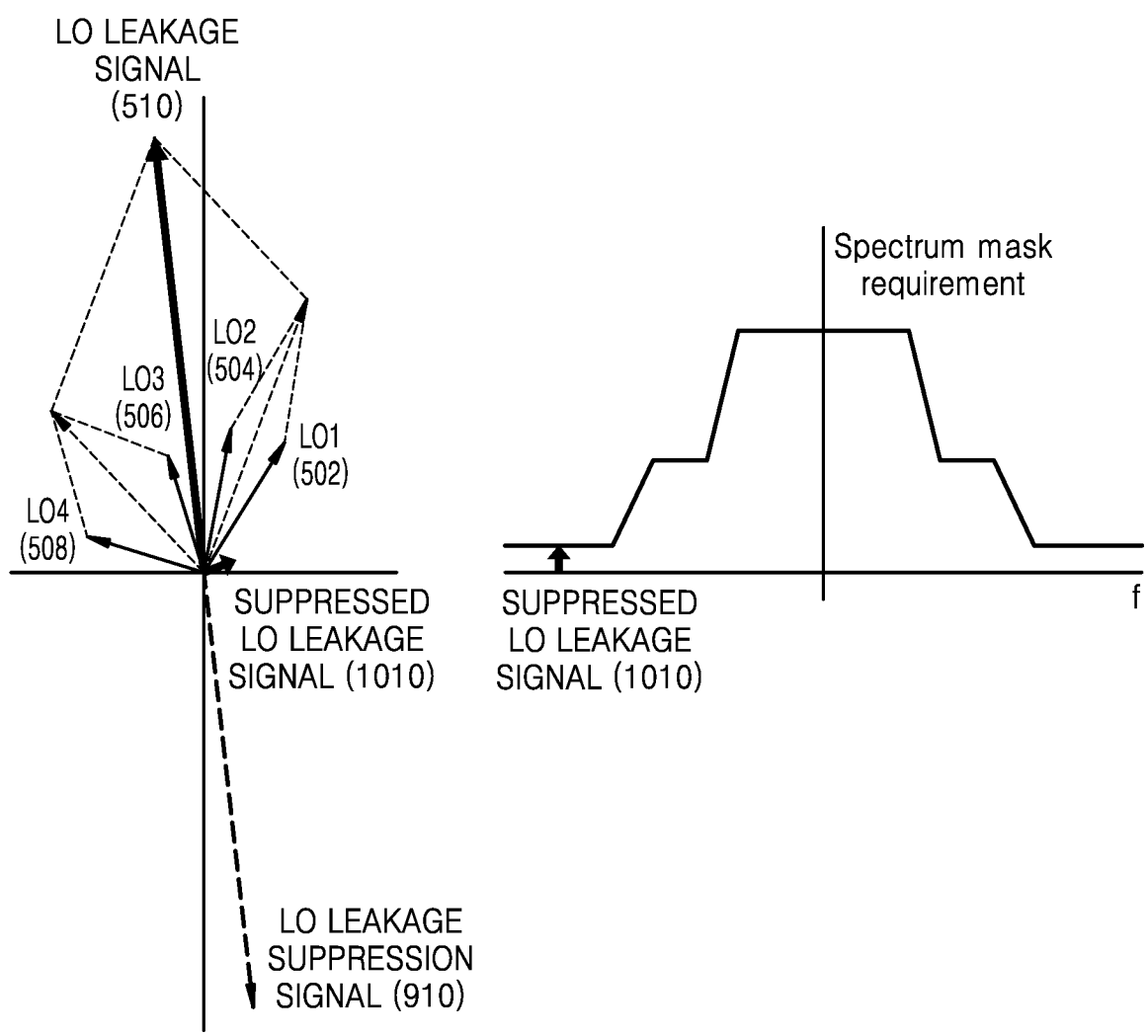

FIG. 10 illustrates a suppressed LO leakage signal 1010 after suppression based on the LO leakage suppression signal. Herein, the suppressed LO leakage signal 1010 of FIG. 10 may correspond to the summed LO leakage signal 920 of FIG. 9.

In a second-order plane of FIG. 10, the suppressed LO leakage signal 1010 corresponding to summation of the LO leakage signal 1010 and an LO leakage suppression signal 1020 is shown.

In a frequency spectrum of FIG. 10, the suppressed LO leakage signal 1010 shown in the second-order plane is indicated by an arrow. In this case, the suppressed LO leakage signal 1010 satisfies spectrum mask requirements.

According to a disclosed embodiment, it may be seen that a problem of failing to satisfy spectrum mask requirements due to summation of LO leakage signals of respective Tx chains in a phase-arrayed system having a plurality of Tx chains may be solved by an LO leakage suppression signal generated in the RF signal transmission apparatus 100.

Figure 11:
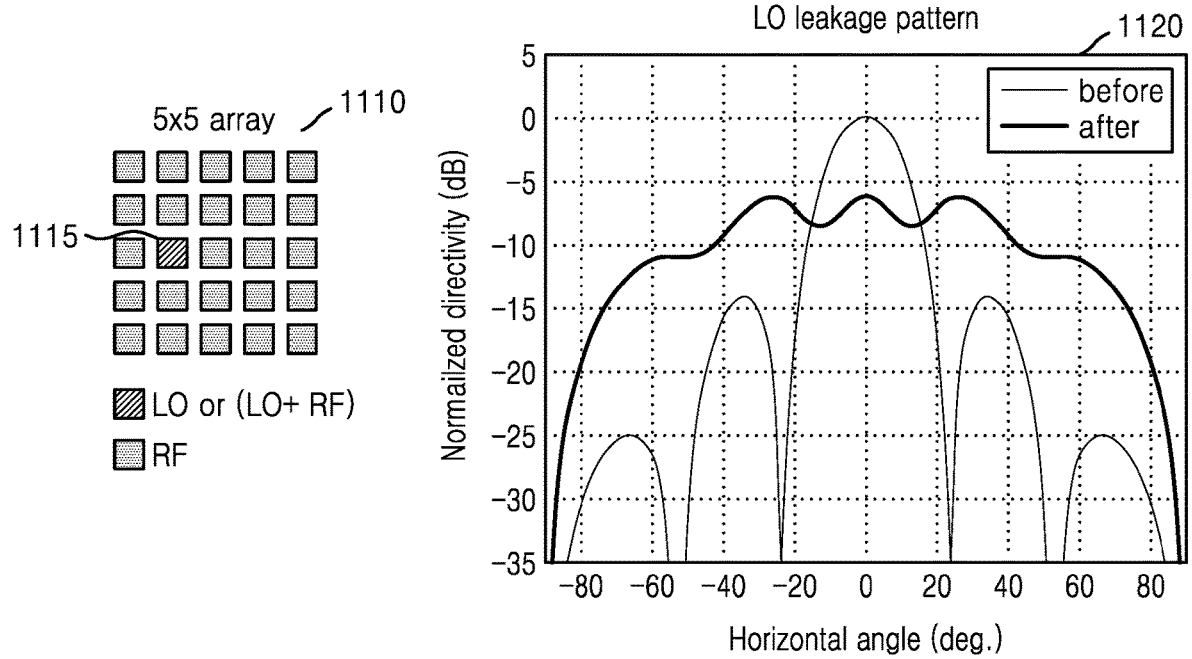
FIGS. 11 and 12 illustrate a simulation result of a control method of an RF signal transmission apparatus to suppress an LO leakage signal, according to an embodiment.
Figure 12:
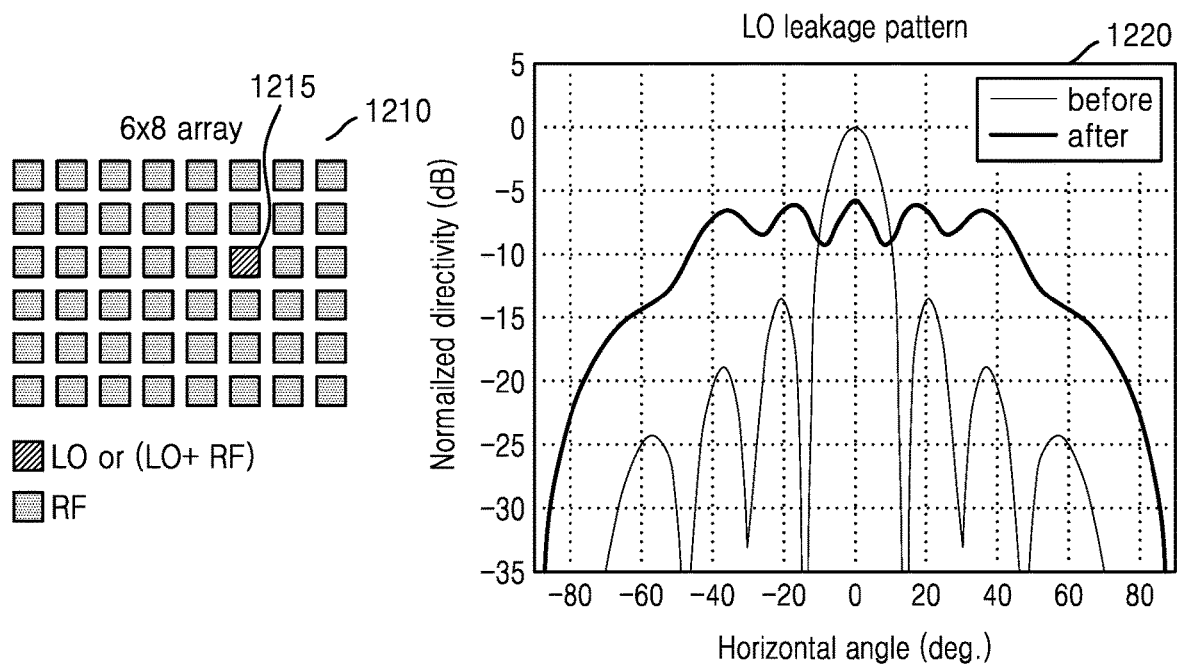

FIGS. 11 and 12 illustrate a simulation result of a control method of the RF signal transmission apparatus 100 to suppress an LO leakage signal, according to an embodiment.

FIG. 11 shows an LO leakage signal suppression simulation result when the plurality of Tx chains 120 include 25 Tx chains and a beamforming direction is a bore sight, according to an embodiment. Referring to FIG. 11, in a 5×5 array 1110 indicating the 25 Tx chains, the LO leakage suppression chain 140 may share an antenna with one 1115 of the plurality of Tx chains 120. Referring to a graph 1120 indicating an LO leakage pattern of FIG. 11, a level of an LO leakage signal for a phase of 0 degree (bore sight) is suppressed after generation of the LO leakage suppression signal by the LO leakage suppression chain 140.

FIG. 12 shows an LO leakage signal suppression simulation result when the plurality of Tx chains 120 include 48 Tx chains and a beamforming direction is a bore sight, according to an embodiment. Referring to FIG. 12, in a 6×8 array 1210 indicating the 48 Tx chains, the LO leakage suppression chain 140 may share an antenna with one 1215 of the plurality of Tx chains 120. Referring to a graph 1220 indicating an LO leakage pattern of FIG. 12, a level of an LO leakage signal for a phase of 0 degree (bore sight) is suppressed after generation of the LO leakage suppression signal by the LO leakage suppression chain 140.

Meanwhile, the foregoing embodiment may be written as a program executable on computers, and may be implemented on a general-purpose digital computer operating the program by using a computer-readable recording medium. In addition, a structure of data used in the foregoing embodiment may be recorded on a computer-readable recording medium using various means. Moreover, the foregoing embodiment may be implemented with a recording medium including a computer-executable command such as a computer-executable programming module. For example, methods implemented with a software module or algorithm may be stored in a computer-readable recording medium as codes or program instructions that are readable and executable by computers.

The computer-readable recording medium may be an available medium that is accessible by a computer, and includes all of a volatile medium, a non-volatile medium, a separated medium, and a non-separated medium. The computer-readable recording medium may include, but not limited to, a storage medium, for example, a magnetic storage medium such as a read-only memory (ROM), a floppy disk, a hard disk, etc., an optical reading medium such as a compact-disc (CD)-ROM, a digital versatile disc (DVD), etc. The computer-readable recording medium may also include both a computer storage medium and a communication medium.

Moreover, a plurality of computer-readable recording media may be distributed over network-connected computer systems, and data, for example, program instructions and codes, stored in the distributed recording media, may be executed by at least one computer.

While embodiments of the disclosure have been described with reference to the attached drawings, those of ordinary skill in the art to which the disclosure pertains will appreciate that the disclosure may be implemented in different detailed forms without departing from the technical spirit or essential characteristics of the disclosure. Accordingly, the aforementioned embodiments of the disclosure should be construed as being only illustrative, but should not be constructed as being restrictive from all aspects.

The invention claimed is:

1. A radio frequency (RF) signal transmission apparatus comprising:
    a plurality of transmission (Tx) chains configured to generate a plurality of RF signals;
    a signal detector configured to measure magnitude of a local oscillator (LO) leakage signal of a beam formed based on the plurality of RF signals;
    an LO;
    an LO leakage suppression chain connected with the LO; and at least one processor configured to generate an LO leakage suppression signal through the LO leakage suppression chain, based on the magnitude of the LO leakage signal,
wherein the LO leakage suppression chain comprises a variable gain amplifier configured to adjust magnitude of the LO leakage suppression signal, a phase shifter configured to adjust a phase of the LO leakage suppression signal, and an antenna configured to transmit the LO leakage suppression signal.

2. The RF signal transmission apparatus of claim 1, wherein the at least one processor is further configured to generate the LO leakage suppression signal through the LO leakage suppression chain, when the magnitude of the LO leakage signal is greater than a preset value.

3. The RF signal transmission apparatus of claim 1, wherein the variable gain amplifier is further configured to output the magnitude of the LO leakage suppression signal according to the magnitude of the LO leakage signal.

4. The RF signal transmission apparatus of claim 1, wherein the phase shifter is further configured to adjust the phase of the LO leakage suppression signal to differ by 180 degrees from a phase of the LO leakage signal.

5. The RF signal transmission apparatus of claim 1, wherein the LO leakage suppression signal is transmitted via the antenna comprised in the LO leakage suppression chain or an antenna of one of the plurality of transmission chains.

6. The RF signal transmission apparatus of claim 1, wherein the at least one processor is further configured to generate a lookup table (LUT) comprising information about the magnitude and a-the phase of the LO leakage suppression signal corresponding to the formed beam.

7. The RF signal transmission apparatus of claim 1,
wherein each of the plurality of transmission chains comprises a phase shifter and a power amplifier, and
wherein the at least one processor is further configured to perform beamforming to form the beam by controlling the phase shifter and the power amplifier based on magnitudes of the plurality of RF signals measured by the signal detector.

8. The RF signal transmission apparatus of claim 7, wherein each of the plurality of transmission chains comprises an intermediate frequency (IF) chain and an RF chain, and
the phase shifter is included in at least one of the IF chain or the RF chain.

9. The RF signal transmission apparatus of claim 1, wherein each of the plurality of transmission chains comprises a power amplifier,
wherein the LO is connected to the plurality of transmission chains through a plurality of LO chains, each of which comprises a phase shifter, and
wherein the at least one processor is further configured to perform beamforming to form the beam by controlling the phase shifter and the power amplifier based on magnitudes of the plurality of RF signals measured by the signal detector.

10. A control method of a radio frequency (RF) signal transmission apparatus, the control method comprising:
performing beamforming to form a beam based on a plurality of RF signals generated in a plurality of transmission chains;
measuring magnitude of a local oscillator (LO) leakage signal of the beam formed by performing beamforming; and
generating an LO leakage suppression signal through an LO leakage suppression chain connected with an LO, based on the magnitude of the LO leakage signal,
wherein the LO leakage suppression chain comprises a variable gain amplifier configured to adjust magnitude of the LO leakage suppression signal, a phase shifter configured to adjust a phase of the LO leakage suppression signal, and an antenna configured to transmit the LO leakage suppression signal.

11. The control method of claim 10, wherein the generating of the LO leakage suppression signal comprises:
setting magnitude of the LO leakage suppression signal to the magnitude of the LO leakage signal; and
adjusting a phase of the LO leakage suppression signal to differ by 180 degrees from a phase of the LO leakage signal.

12. The control method of claim 10, further comprising transmitting the LO leakage suppression signal via the antenna comprised in the LO leakage suppression chain or an antenna of at least one transmission chain among the plurality of transmission chains.

13. The control method of claim 10, further comprising generating a lookup table (LUT) comprising information about the magnitude and the phase of the LO leakage suppression signal corresponding to the formed beam.

14. A computer program product comprising a non-transitory computer-readable storage medium, wherein the non-transitory computer-readable storage medium comprises instructions for executing the control method of the RF signal transmission apparatus according to claim 10.

* * * * *